United States Patent
Jajodia

(10) Patent No.: US 8,082,452 B2
(45) Date of Patent: Dec. 20, 2011

(54) PROTECTING SENSITIVE DATA ASSOCIATIONS

(75) Inventor: Sushil Jajodia, Oakton, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 968 days.

(21) Appl. No.: 11/947,164

(22) Filed: Nov. 29, 2007

(65) Prior Publication Data

US 2008/0137841 A1 Jun. 12, 2008

Related U.S. Application Data

(60) Provisional application No. 60/868,765, filed on Dec. 6, 2006, provisional application No. 60/910,608, filed on Apr. 6, 2007.

(51) Int. Cl.
*G06F 11/30* (2006.01)

(52) U.S. Cl. .................. 713/193; 726/26; 707/655

(58) Field of Classification Search .......... 380/277–286; 726/2–3, 16, 26; 713/193; 707/600, 609–610, 707/640, 644–647, 655–656, 687, 690, 694, 707/696, 790, 802, 809, 899

See application file for complete search history.

(56) References Cited

U.S. PATENT DOCUMENTS

| | | | | |
|---|---|---|---|---|
| 5,268,962 A * | 12/1993 | Abadi et al. | ................. | 713/161 |
| 6,367,010 B1 * | 4/2002 | Venkatram et al. | ........... | 713/171 |
| 7,093,137 B1 * | 8/2006 | Sato et al. | ..................... | 713/193 |
| 2002/0046286 A1 * | 4/2002 | Caldwell et al. | ............. | 709/229 |
| 2005/0166263 A1 * | 7/2005 | Nanopoulos et al. | ............. | 726/7 |
| 2006/0041533 A1 * | 2/2006 | Koyfman | ........................ | 707/3 |
| 2006/0288232 A1 * | 12/2006 | Ho et al. | ...................... | 713/185 |
| 2007/0079386 A1 * | 4/2007 | Metzger et al. | ................. | 726/29 |
| 2008/0123843 A1 * | 5/2008 | Machani | ........................ | 380/44 |

* cited by examiner

*Primary Examiner* — Kim Vu
*Assistant Examiner* — Darren B Schwartz
(74) *Attorney, Agent, or Firm* — David Grossman

(57) ABSTRACT

Sensitive data associations for related data values are protected. A set of related data values is received. The set of related data values include at least a first data value and a second data value. The first data value is associated with a first data field and the second data value is associated to a second data field. First encrypted data is created by encrypting the first data value using a first encryption key and a second encrypted data is created by encrypting the second data value using a second encryption key. The first data value is stored in a first data table, the second data value is stored in a second data table, the first encrypted data is stored in the second table, and the second encrypted data is stored in the first table.

21 Claims, 10 Drawing Sheets

Table 210
210

Field 1 — 141 | e(field 2) — 240

| | |
|---|---|
| data value 1,1 — 111 | e(data value 1,2) — 241 ... |
| data value 2,1 — 121 | e(data value 2,2) — 242 ... |
| ⋮ | ⋮ |
| data value m,1 — 131 | e(data value m,2) — 243 ... |

Table 220
220 e(Field 1) — 250 | field 2 — 142

| | |
|---|---|
| e(data value 1,1) — 251 | data value 1,2 — 112 ... |
| e(data value 2,1) — 252 | data value 2,2 — 122 ... |
| ⋮ | ⋮ |
| e(data value m,1) — 253 | data value m,2 — 132 ... |

FIGURE 2

Related Data Sets
310

| | Name | SSN | Spouse | Salary |
|---|---|---|---|---|
| Related Data Set 1 | David | 111-11-1111 | Judith | 400 |
| Related Data Set 2 | Mary | 222-22-2222 | Robert | 300 |
| Related Data Set 3 | John | 333-33-3333 | Susan | 300 |

Rule
The following pairs of data cannot be together in the clear:
(name, SSN)

320

Table 330
330

| e(Name) | SSN | Spouse | Salary |
|---|---|---|---|
| e(David) | 111-11-1111 | Judith | 400 |
| e(Mary) | 222-22-2222 | Robert | 300 |
| e(John) | 333-33-3333 | Susan | 300 |

Table 340
340

| Name | e(SSN) | Spouse | Salary |
|---|---|---|---|
| David | e(111-11-1111) | Judith | e(400) |
| Mary | e(222-22-2222) | Robert | e(300) |
| John | e(333-33-3333) | Susan | e(300) |

FIGURE 3

Rules:
The following pairs of data cannot be together in the clear:
(name, SSN)
(name, salary)
(SSN, Salary)
(Spouse, Salary)

420

Table 430
430

| Name | Spouse | e(SSN) |
|---|---|---|
| David | Judith | e(111-11-1111) |
| Mary | Robert | e(222-22-2222) |
| John | Susan | e(333-33-3333) |

Table 440
440

| Name | Spouse | e(Salary) |
|---|---|---|
| David | Judith | e(400) |
| Mary | Robert | e(300) |
| John | Susan | e(300) |

Table 450
450

| Name | $e_1$(SSN) | Spouse | $e_2$(Salary) |
|---|---|---|---|
| David | $e_1$(111-11-1111) | Judith | $e_2$(400) |
| Mary | $e_1$(222-22-2222) | Robert | $e_2$(300) |
| John | $e_1$(333-33-3333) | Susan | $e_2$(300) |

FIGURE 4

Table 510
510

| field 1 230 | e(field 2⊕salt 1) 530 | | salt 1 field 540 |
|---|---|---|---|
| data value 1,1 111 | e(data value 1,2 ⊕salt value 1,1) 531 | ••• | salt value 1,1 541 |
| data value 2,1 121 | e(data value 2,2 ⊕salt value 21) 532 | ••• | salt value 2,1 542 |
| ⋮ | ⋮ | | ⋮ |
| data value m,1 131 | e(data value m,2 ⊕salt value m,1) 533 | ••• | salt value m,1 543 |

Table 520
520

| e(field 1⊕salt 2) 350 | field 2 260 | | salt 2 field 570 |
|---|---|---|---|
| e(data value 1,1 ⊕salt value 1,2) 551 | data value 1,2 112 | ••• | salt value 1,2 571 |
| e(data value 2,1 ⊕salt value 2,2) 552 | data value 2,2 122 | ••• | salt value 2,2 572 |
| ⋮ | ⋮ | | ⋮ |
| e(data value m,1 ⊕salt value m,2) 553 | data value m,2 132 | ••• | salt value 3,2 573 |

FIGURE 5

Rule
The following pairs of data cannot be together in the clear:
(name, Salary)
620

Table 630
630

| e(Name⊕salt) | Salary | Salt |
|---|---|---|
| e(David⊕S1) | 400 | S1 |
| e(Mary⊕S2) | 300 | S2 |
| e(John⊕S3) | 300 | S3 |

Table 640
640

| Name | e(Salary⊕salt) | Salt |
|---|---|---|
| David | e(400⊕S4) | S4 |
| Mary | e(300⊕S5) | S5 |
| John | e(300⊕S6) | S6 |

To retrieve Name:
Name = d( e(Name⊕salt))⊕salt
650

To retrieve Salary:
Salary = d( e(Salary⊕salt))⊕salt
660

FIGURE 6

PROTECTING SENSITIVE DATA ASSOCIATIONS

CROSS-REFERENCE TO RELATED APPLICATIONS

This application claims the benefit of U.S. Provisional Application No. 60/868,765, filed Dec. 6, 2006, entitled "Protecting Sensitive Data Associations," and U.S. Provisional Application No. 60/910,608, filed Apr. 6, 2007, entitled "Protecting Sensitive Data Associations" which are hereby incorporated by reference in its entirety.

BACKGROUND OF THE EMBODIMENTS OF THE INVENTION

Federal and state governments are passing laws that define what constitutes personal information of individuals and mandating that there be procedures for protecting that personal information. An example of such a law is the California Security Breach Information Act (SB-1386) (enacted). This bill is a California state law requiring organizations that maintain personal information about individuals to inform those individuals if the security of their information is compromised. The Act stipulates that if there's a security breach of a database containing personal data, the responsible organization must notify each individual for whom it maintained information. The Act, which went into effect Jul. 1, 2003, was created to help stem the increasing incidence of identity theft. According to the Federal Trade Commission, the organization received 214,905 complaints of identity theft in 2003, up 40% from 2002. Accordingly, there is a need for a simple but useful technique that can be incorporated in commercial databases to protect personal data from theft without seriously affecting the availability of the personal data to those that have a need to use it.

BRIEF DESCRIPTION OF THE SEVERAL VIEWS OF THE DRAWINGS

FIG. 2 is a block diagram of example tables containing some of the data from the related data sets of FIG. 1 with the data associations hidden as per an aspect of an embodiment of the present invention.

FIG. 3 shows an example related data sets, an example rule, and tables containing some of the data from the related data set with the data associations hidden according to the rule as per an aspect of an embodiment of the present invention.

FIG. 4 shows other example rules, and two sets of tables containing some of the data from the related data set with the data associations hidden according to the rule as per an aspect of an embodiment of the present invention.

FIG. 5 is a block diagram of example tables containing some of the data from the related data sets of FIG. 1 with the data associations hidden using salt values as per an aspect of an embodiment of the present invention.

FIG. 6 shows another example rule, tables containing some of the data from the related data set with the data associations hidden according to the rule using salt values, and formulas for retrieving data of interest as per an aspect of an embodiment of the present invention.

DETAILED DESCRIPTION OF EMBODIMENTS

Embodiments of the present invention provide a simple but useful technique that can be incorporated in commercial databases to protect personal data from theft without seriously affecting the availability of the personal data to those that have a need to use it.

Figure 1:
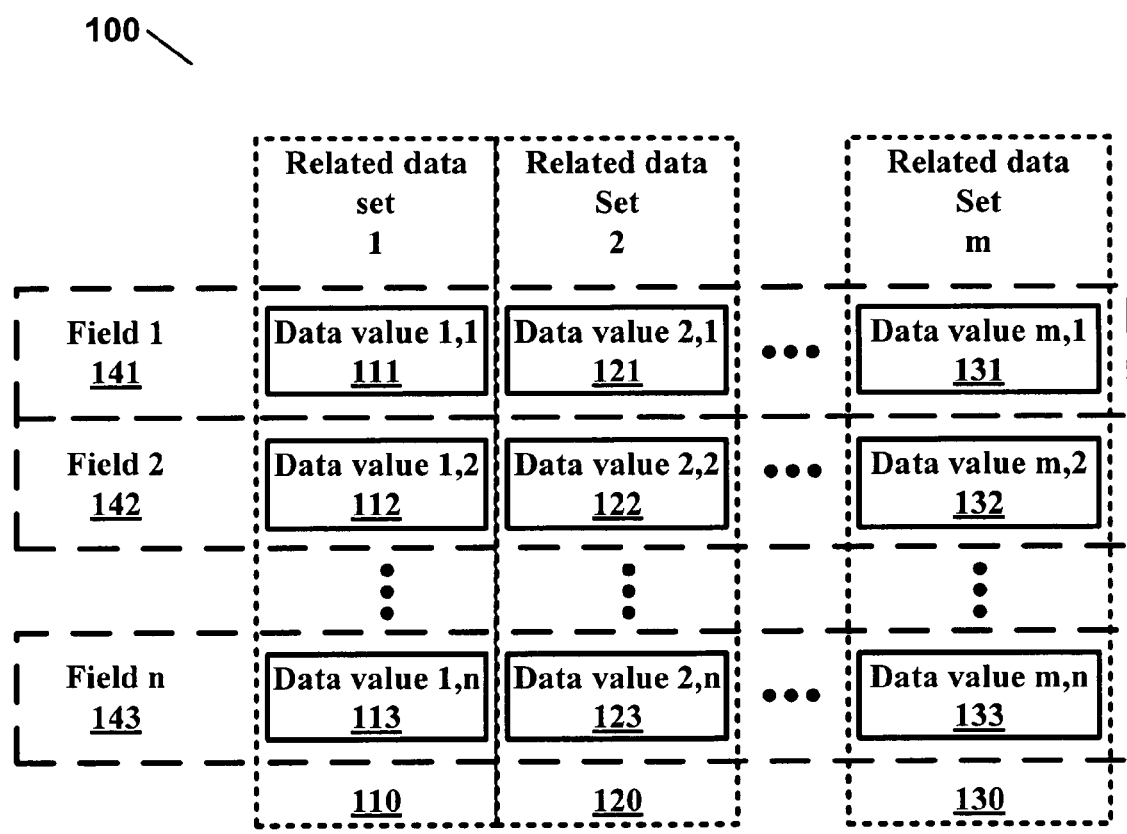
FIG. 1 is a block diagram of example related data sets as per an aspect of an embodiment of the present invention.

FIG. 1 is a block diagram of example related data sets 100 as per an aspect of an embodiment of the present invention. As shown related data sets 1 thru m are shown (110, 120, and 130). Each of these related data sets have data values associated with data fields (shown as field 1 141, field 2 142 and field n 143).

FIG. 2 is a block diagram of example tables 210 and 220 containing some of the data from the related data sets of FIG. 1 with the data associations hidden as per an aspect of an embodiment of the present invention. A first table 210 is populated with clear data (111, 121, . . . 131) for a first field 141 and encrypted data (241, 242, . . . 243) for a second field (240). A second table 220 is populated with clear data (112, 122, . . . 132) for the second field 142 and encrypted data (251, 252, 253) for the first field (250). This combination allows a user to retrieve data for a particular field without being able to correlate the data to the other fields, thus hiding the association between the data values.

FIG. 3 shows example related data sets 310, an example rule 320, and tables 330 and 340 containing some of the data from the related data set(s) 310 with the data associations hidden according to rule 320 as per an aspect of an embodiment of the present invention. Rule 320 states that the data values for the name and SSN fields cannot be in the clear together. The solution is to break the data into two tables 330 and 340. Table 330 has encrypted the data values associated with the name field but leaves the other data available for analysis, reports, etc. Table 340 has encrypted the data values associated with the SSN field, but leaves the data values associated with the other fields in the clear. Therefore, neither table alone allows the data associations between the name and SSN fields to be made between the values even though the other data is available in the clear for other legitimate uses.

FIG. 4 shows other example rules 420, and two sets of tables 430, 440 and 450 containing some of the data from the related data set 310 with the data associations hidden according to rule 420 as per an aspect of an embodiment of the present invention. This figure shows that there can be more than one way to satisfy rules such as rules 420. Tables 430 and 440 together satisfy the rules. Similarly, table 450 satisfies rules 420 by itself.

Table 430 and table 440 satisfy the rules by breaking up the data so that name and spouse data are available in the clear in table 430 along with an encrypted copy of the SSN data and name and spouse data are available in the clear in table 440 along with encrypted copies of the salary data. Therefore, neither name and SSN, name and salary, SSN and salary, or spouse and salary are together in the clear in the same table.

Table 450 shows another solution that also satisfies rule 420 with only one table. This is done by using more than one encryption key. In this table, data associated with the SSN field and data associated with the salary field are encrypted using separate keys. Therefore, the rules are satisfied and authorized users of either the SSN or the salary data may get access to that data without exposing the data.

FIG. 5 is a block diagram of example tables containing some of the data from the related data sets of FIG. 1 with the data associations hidden using salt values as per an aspect of an embodiment of the present invention. Data (541, 542, . . . 543) associated with the salt 1 field 540 are stored in table 510. These salt values salt values (541, 542, . . . 543) may then be used to fill and extract data values (531, 532, . . . 533) from the encrypted field data 2 field 530. Note that the data values (111, 121, . . . 131) associated with field 1 230 are in the clear.

Similarly, data (571, 572, . . . 573) associated with the salt 2 field 570 are stored in table 520. These salt values salt values (571, 572, . . . 573) may then be used to fill and extract data values (551, 552, . . . 553) from the encrypted field data 1 field 550. Note that the data values (112, 122, . . . 132) associated with field 2 260 are in the clear.

FIG. 6 shows another example rule, tables containing some of the data from the related data set with the data associations hidden according to the rule using salt values, and formulas for retrieving data of interest as per an aspect of an embodiment of the present invention. Rule 620 states that name and salary information cannot be together in the clear. To accomplish this, the name values are exclusive OR'ed with the data associated with salt field, encrypted and then stored in the table 630. The salary and salt data may be in the clear. The data associated with the salary field are exclusive OR'ed with the data associated with the salt field, encrypted and then stored in the table 640. Therefore, neither the name or salary data is available in the clear in the same table.

To retrieve the name data, the encrypted name values in table 630 need to be decrypted and then exclusive OR'ed with the appropriate salt value as shown in 650. Similarly, to retrieve the salary data, the encrypted salary values in table 640 need to be decrypted and then exclusive OR'ed with the appropriate salt value as shown in 660. Using this technique, separate records with the same name or salary data values will have different encrypted values, making it difficult, if at all possible to correlate records with known values with records that have unknown values.

Figure 7:
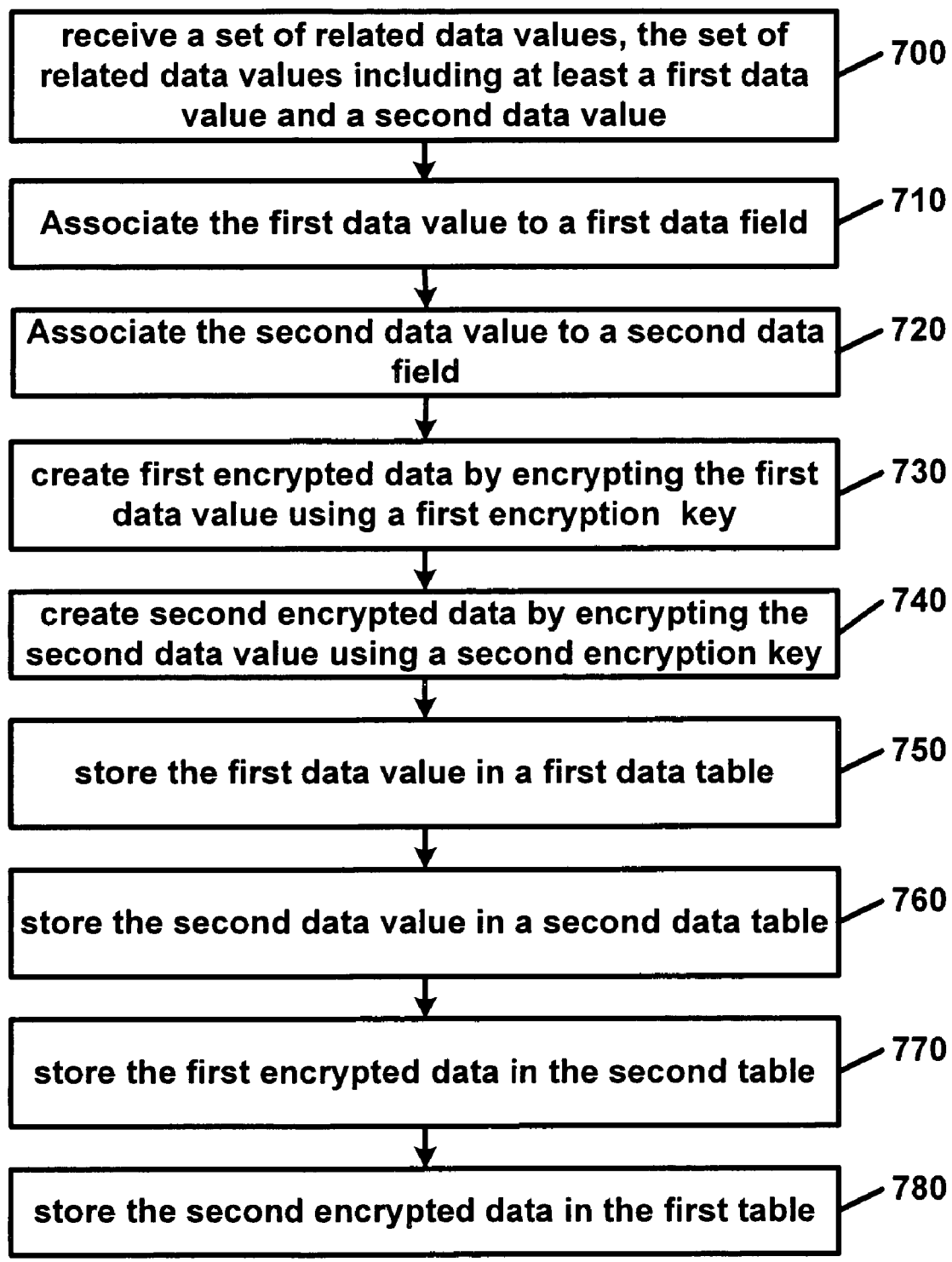
FIG. 7 is a flow diagram of an aspect of an embodiment of the present invention.

Some embodiments of the present invention protect sensitive data associations through the use of a method. FIG. 7 is a flow diagram of an example method as per an aspect of an embodiment of the present invention. The method includes receiving a set of related data values at 700. The set of related data values should include at least a first data value and a second data value. The data values should be associated with appropriate data fields at 710. For example, the first data value should be associated to a first data field and the second data value should be associated to a second data field. These associations may be performed for many data values and data fields, however, for clarity they are being described in the basic case of two data values and fields.

A rule may be used to indicate which associations are to be kept secret. For example, in this case of two data values and fields, the rule may state that that the association of the first data value and the second data value needs to be kept secret. To enforce this rule, data values may be encrypted that will be stored in separate tables. As shown, first encrypted data may be created at 730 by encrypting the first data value using a first encryption key. Similarly, second encrypted data may be created at 740 by encrypting the second data value using a second encryption key.

To hide the associations, the data values and encrypted data may be stored in separate tables, thus allowing access to particular fields of data to a user in one table without exposing the data from other fields in the related data set. In the current example this is done by storing the first data value in a first data table at 750, storing the second data value in a second data table at 760, storing the first encrypted data in the second table at 770, and storing the second encrypted data in the first table at 780.

The actions above may be repeated for additional sets of related data values.

After the data values have been stored, they may be retrieved from the proper table by an authorized user who possesses the decryption proper key. For example, the first data value may be obtained by: retrieving the first encrypted data from the second table; and then decrypting the first encrypted data using a first decryption key. Similarly, the second data value may be obtained by: retrieving the second encrypted data from the first table; and then decrypting the second encrypted data using a second decryption key.

Many combinations of keys may be used. The encryption key and the decryption key may be the same symmetric key. The first encryption key and the second encryption key may be the same or different. The decryption keys for any particular data value will need to work with the encryption key used to encrypt that data value. When the first encryption key and the second encryption key are the same, the first decryption key and the second decryption key may also need to be the same.

Figure 8:
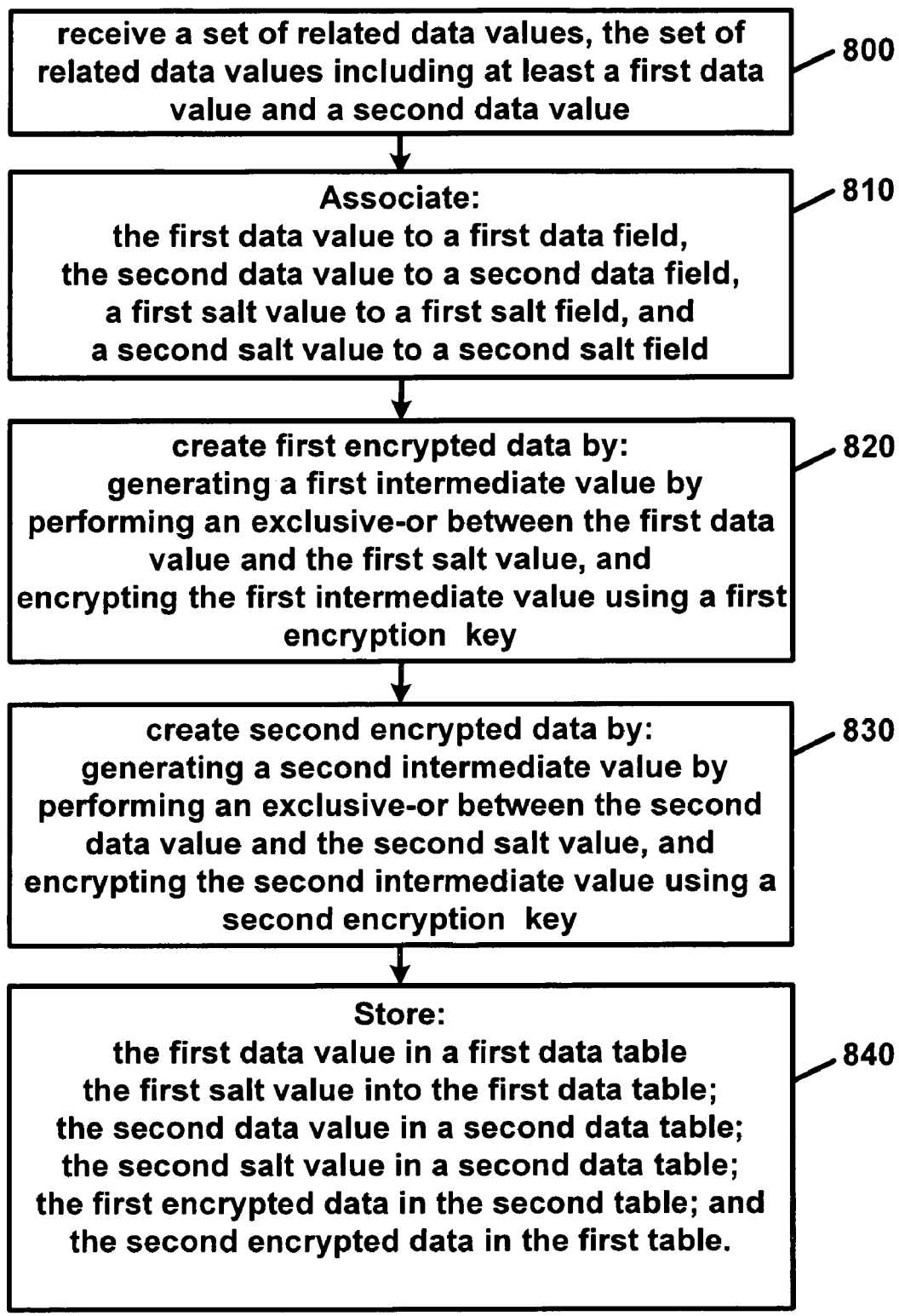
FIG. 8 is a flow diagram of an aspect of another embodiment of the present invention.

FIG. 8 is a flow diagram of an aspect of another embodiment of the present invention for protecting sensitive data associations where salt values are utilized to ensure that identical data from different related data sets do not inadvertently disclose associations by having identically encrypted values. A set of related data values is received at 800. The set of related data values preferably includes at least a first data value and a second data value. At 810 data values and salt values are associated with their appropriate data fields. As shown in the illustrated example, the first data value is associated to a first data field, the second data value is associated to a second data field, a first salt value is associated to a first salt field, and a second salt value is associated to a second salt field. The first salt value and the second salt value may be random or pseudo-random values. Although some embodiments, the first salt value and the second salt value are the same, it may be necessary to protect inadvertent disclosure of data to have the first salt value and the second salt value be different.

Associated data values may be encrypted at 820 and 830. First encrypted data is created at 820. To do this, a first intermediate value is generated by performing an exclusive-or between the first data value and the first salt value. Then the first intermediate value may be encrypted using a first encryption key. Similarly, second encrypted data is created at 830 by generating a second intermediate value by performing an exclusive-or between the second data value and the second salt value and then encrypting the second intermediate value associated with the second field using a second encryption key.

At 840, the data and salt values are stored in tables such that the association between the values in the related data set are protected according to the rule(s). In the present example, a rule indicates that the association of the first data value and the second data value needs to be kept secret. Consequently, the first data value is stored in a first data table, the first salt value is stored in the second data table, the second data value is stored in a first data table, the second salt value is stored in a second data table, the first encrypted data is stored in the second table, and the second encrypted data is stored in the first table.

The first data value may be retrieved by: retrieving the first encrypted data from the second table; generating a third intermediate value by decrypting the first encrypted data using a first decryption key; and performing an exclusive-or between the third intermediate value and the first salt value. Similarly, the second data value may be retrieved by: retrieving the second encrypted data from the first table; generating a fourth intermediate value by decrypting the second encrypted data using a second decryption key; and performing an exclusive-or between the fourth intermediate value and the second salt value.

Figure 9:
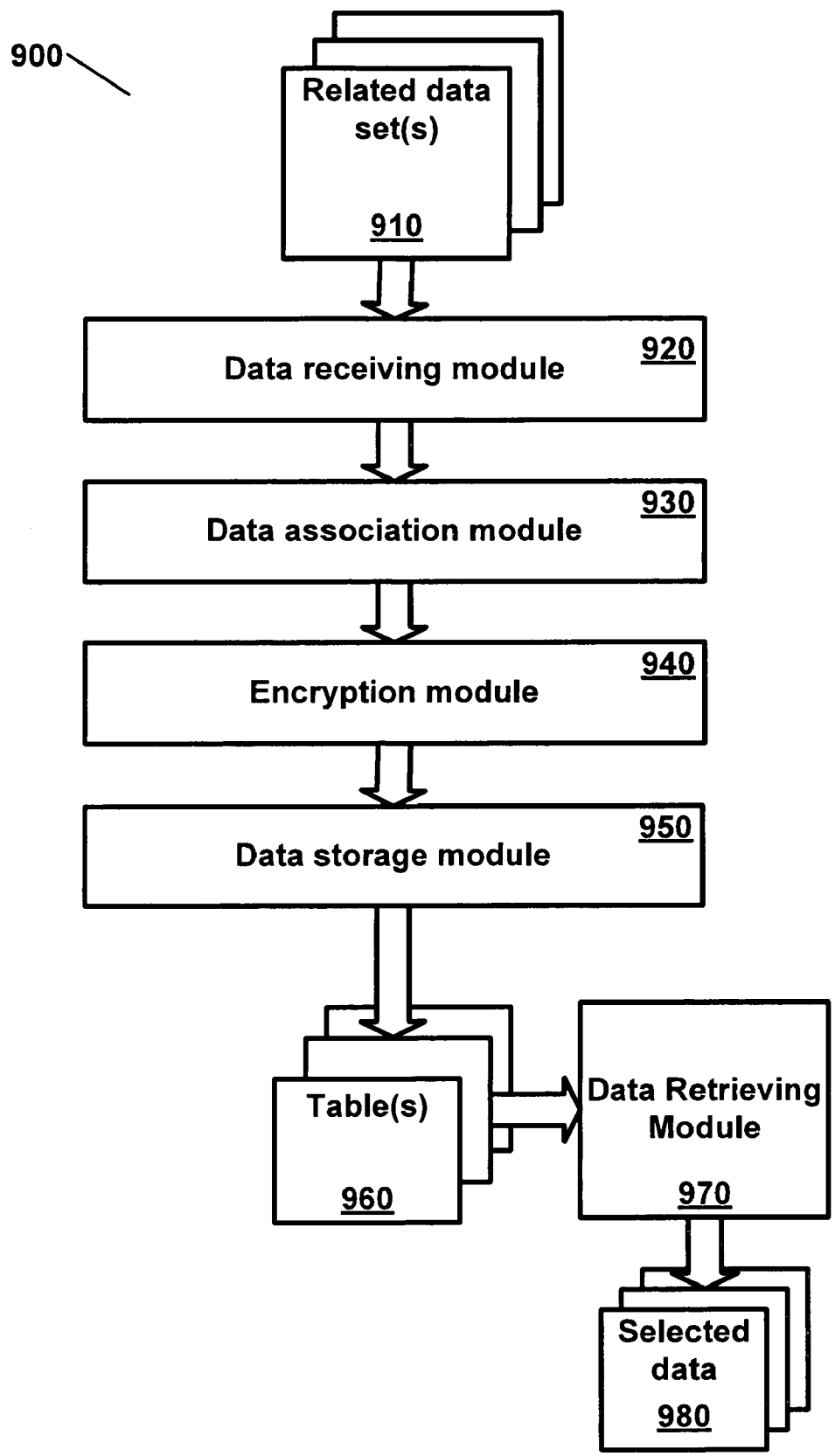
FIG. 9 is a block diagram of an aspect of an embodiment of the present invention.

Embodiments of the present invention may be built as a system. FIG. 9 is a block diagram of a system 900 for protecting sensitive data associations according to an aspect of an embodiment of the present invention. The block diagram shows a multitude of modules. The modules may use software, firmware, hardware, either by themselves or in combination. For example, some of the modules may be software modules that run on general purpose computer. However, in some embodiments, the modules could be configured as firmware that runs on customized microprocessor. In some cases, some of the processing may be performed using programmable logic such as FPGA or ASIC logic. On example of a hardware implementation may be a USB memory device that has customized logic to selectively hold table data created using embodiments of aspects of the present invention for access by authorized users only.

As shown, the system includes a data receiving module 920 configured to receive a set(s) of related data values 910. The set(s) of related data values 910 preferably include at least a first data value and a second data value. The system normally operates against rule(s) that indicates which data value associations need to be kept secret. In the absence of such a rule, a default rule may be used such as the association of the first data value and the second data value needs to be kept secret.

A data association module 930 may be configured to associate the first data value to a first data field; and the second data value to a second data field. An encryption module 940 may then create first encrypted data by encrypting the first data value using a first encryption key; and create second encrypted data by encrypting the second data value using a second encryption key. A data storage module 950 is configured to store: the first data value in a first data table; the second data value in a second data table; the first encrypted data in the second table; and the second encrypted data in the first table.

A data retrieving module(s) 970 may be used to retrieve: the first data value by decrypting the first encrypted data using a first decryption key and/or the second first data value by decrypting the second encrypted data using a second decryption key. As with the method embodiments, there are many possibilities for the encryption and decryption keys. The encryption key and the decryption key may be the same symmetric key. The encryption keys may be different or the same. Similarly the decryption keys may be the same or different. The choice of keys should be made carefully to ensure that the data relationships in the rule(s) be kept secret. In some embodiments, the rule may bee received from an external source. In the absence of an external rule, and internal rule or a default rule may be used.

The system of FIG. 9 may also apply salt values to prevent identical data from encrypting to an identical value. The salt values may be stored in salt fields. Generally, the salt values are either random or pseudo-random values. The data may then be encrypted by generating an intermediate value by performing an exclusive-or between the data value and the salt value and then encrypting the intermediate value using an encryption key. This technique may be applied to as many data values as necessary.

The storage module can then store the salt values in the appropriate tables to be used in retrieving the encrypted data. The data values may be retrieved by retrieving the encrypted data from the appropriate table, generating an intermediate value by decrypting the encrypted data using a decryption key, and then performing an exclusive-or between the intermediate value and the salt value.

Figure 10:
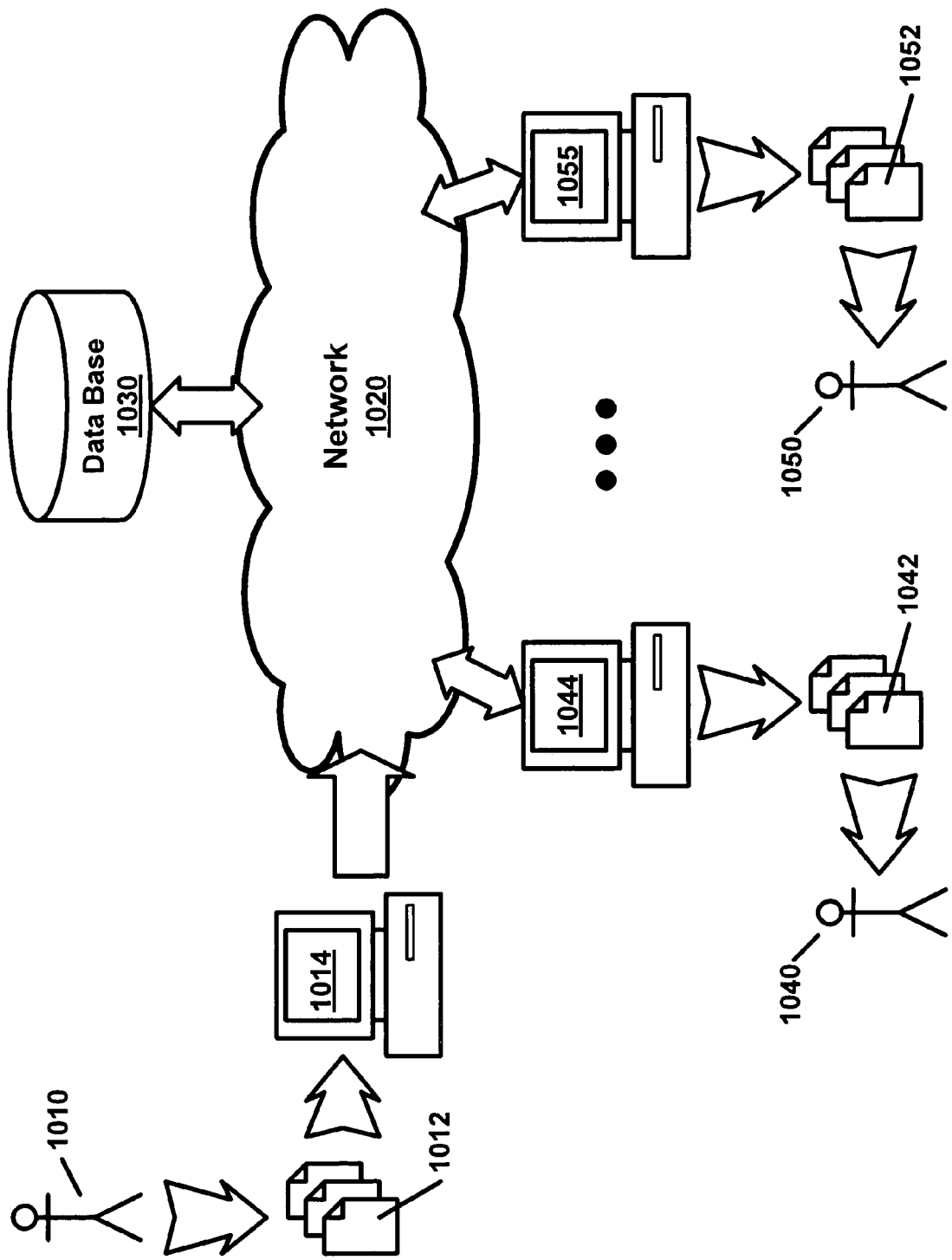
FIG. 10 is a block diagram showing how an aspect of an embodiment of the present invention may be used.

FIG. 10 is an illustrative diagram showing how an embodiment of the present invention may be used. A first user 1010 may input personal data 1012 associated with an individual into a database 1030 through a network 1020 using a computer 1014. The personal data may come from many sources such as a person directly or a tangible form filled out by a person. The data may be stored in database 1030 in tables that separate the data so as to protect the relationship between selected pieces of the private information. Users (1040, 1050 and the like) who have a need to access some of the private data may access data (1042, 1052 and the like) from selected tables in the database 1030 that correspond to their specific need for information through network 1020 using a local computer (1044, 1054 and the like). This figure only shows one possible scenario and should not be considered limiting. For example, users 1040 and 1050 in other embodiments may have bi-directional access to the database 1030. In other embodiments, the database may be shared on an individual machines and not on a network.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of personal data. However, one skilled in the art will recognize that embodiments of the invention could be used to protect associations of other types of data such as research data where for validation purposes it is important to keep associations of some of the research data hidden.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A method for protecting sensitive data associations within a database, comprising:
 (a) receiving a set of related data values, the set of related data values including at least a first unencrypted data value and a second unencrypted data value;
 (b) associating:

(i) the first unencrypted data value to a first data field; and
(ii) the second unencrypted data value to a second data field;
(c) creating first encrypted data by encrypting the first unencrypted data value using a first encryption key;
(d) creating second encrypted data by encrypting the second unencrypted data value using a second encryption key; and
(e) a computer processor storing:
(i) the first unencrypted data value in a first data table;
(ii) the second unencrypted data value in a second data table;
(iii) the first encrypted data in the second data table; and
(iv) the second encrypted data in the first data table; and
wherein:
a rule indicates that the association of the first unencrypted data value and the second unencrypted data value is secret; and
said database includes said first data table and said second data table.

2. The method according to claim 1, further including repeating steps (a)-(e) for additional sets of related data values.

3. The method according to claim 1, further including obtaining the first unencrypted data value by:
(a) retrieving the first encrypted data from the second table; and
(b) decrypting the first encrypted data using a first decryption key.

4. The method according to claim 1, further including obtaining the second data value by:
(a) retrieving the second encrypted data from the first table; and
(b) decrypting the second encrypted data using a second decryption key.

5. A method for protecting sensitive data associations within a database, comprising:
(a) receiving a set of related data values, the set of related data values including at least a first unencrypted data value and a second unencrypted data value;
(b) associating:
(i) the first unencrypted data value to a first data field;
(ii) the second unencrypted data value to a second data field;
(iii) a first salt value to a first salt field; and
(iv) a second salt value to a second salt field;
(c) creating a first encrypted data by:
(i) generating a first intermediate value by performing an exclusive-or between the first unencrypted data value and the first salt value; and
(ii) encrypting the first intermediate value using a first encryption key;
(d) creating second encrypted data by:
(i) generating a second intermediate value by performing an exclusive-or between the second unencrypted data value and the second salt value; and
(ii) encrypting the second intermediate value associated with the second field using a second encryption key; and
(e) a computer processor storing:
(i) the first unencrypted data value in a first data table;
(ii) the first salt value into the second data table;
(iii) the second unencrypted data value in a first data table;
(iv) the second salt value in a second data table;
(v) the first encrypted data in the second table; and
(vi) the second encrypted data in the first table and wherein:
a rule indicates that the association of the first unencrypted data value and the second data value is secret; and
said database includes said first data table and said second data table.

6. The method according to claim 5, wherein the first salt value and the second salt value are random values.

7. The method according to claim 5, wherein the first salt value and the second salt value are pseudo-random values.

8. The method according to claim 5, further including retrieving the first unencrypted data value by:
(a) retrieving the first encrypted data from the second table;
(b) generating a third intermediate value by decrypting the first encrypted data using a first decryption key; and
(c) performing an exclusive-or between the third intermediate value and the first salt value.

9. The method according to claim 5, further including retrieving the second unencrypted data value by:
(a) retrieving the second encrypted data from the first table;
(b) generating a fourth intermediate value by decrypting the second encrypted data using a second decryption key; and
(c) performing an exclusive-or between the fourth intermediate value and the second salt value.

10. The method according to claim 5, wherein the first salt value and the second salt value are the same.

11. A system for protecting sensitive data associations within a database, comprising:
(a) a data receiving module configured to receive a set of related data values, the set of related data values including at least a first data unencrypted value and a second unencrypted data value;
(b) a rule indicating that the association of the first unencrypted data value and the second unencrypted data value is secret;
(c) a data association module configured to associate:
(i) the first unencrypted data value to a first data field; and
(ii) the second unencrypted data value to a second data field;
(d) an encryption module configured to:
(i) create first encrypted data by encrypting the first unencrypted data value using a first encryption key; and
(ii) create second encrypted data by encrypting the second unencrypted data value using a second encryption key; and
(e) a data storage module configured to employ a computer processor to store:
(i) the first unencrypted data value in a first data table;
(ii) the second unencrypted data value in a second data table;
(iii) the first encrypted data in the second table; and
(iv) the second encrypted data in the first table; and
wherein
said database includes said first data table and said second data table.

12. The system according to claim 11, further including a first data retrieving module configured to retrieve the first unencrypted data value by decrypting the first encrypted data using a first decryption key.

13. The system according to claim 11, further including a second data retrieving module configured to retrieve the second first unencrypted data value by decrypting the second encrypted data using a second decryption key.

14. The system according to claim 11, wherein the rule is received from an external source.

15. A system for protecting sensitive data associations within a database, comprising:
(a) a data receiving module configured to receive a set of related data values, the set of related data values including at least a first unencrypted data value and a second unencrypted data value;
(b) a rule indicates that the association of the first unencrypted data value and the second unencrypted data value is secret;
(c) a data association module configured to associate:
  (i) the first unencrypted data value to a first data field;
  (ii) the second unencrypted data value to a second data field;
  (iii) a first salt value to a first salt field; and
  (iv) a second salt value to a second salt field;
(d) an encryption module configured to:
  (i) to create a first encrypted data by:
    (1) generating a first intermediate value by performing an exclusive-or between the first unencrypted data value and the first salt value; and
    (2) encrypting the first intermediate value using a first encryption key; and
  (ii) create a second encrypted data by:
    (1) generating a second intermediate value by performing an exclusive-or between the second unencrypted data value and the second salt value; and
    (2) encrypting the second intermediate value associated with the second field using a second encryption key; and
(e) a storage module configured to employ a computer processor to store:
  (i) the first unencrypted data value in a first data table;
  (ii) the first salt value into the second data table;
  (iii) the second unencrypted data value in a second data table;
  (iv) the second salt value in a first data table;
  (v) the first encrypted data in the second table; and
  (vi) the second encrypted data in the first table; and
wherein
  said database includes said first data table and said second data table.

16. The system according to claim 15, wherein the first salt value and the second salt value are random values.

17. The system according to claim 15, wherein the first salt value and the second salt value are pseudo-random values.

18. The system according to claim 15, further including a first data retrieving module configured to retrieve the first unencrypted data value by:
(a) retrieving the first encrypted data from the second table;
(b) generating a third intermediate value by decrypting the first encrypted data using a first decryption key; and
(c) performing an exclusive-or between the third intermediate value and the first salt value.

19. A system according to claim 15, further including a second data retrieving module configured to retrieve the second unencrypted data value by:
(a) retrieving the second encrypted data from the first table;
(b) generating a fourth intermediate value by decrypting the second encrypted data using a second decryption key; and
(c) performing an exclusive-or between the fourth intermediate value and the second salt value.

20. The system according to claim 15, wherein the first salt value and the second salt value are the same.

21. The system according to claim 15, wherein the rule is received from an external source.

* * * * *